United States Patent
Cardoen et al.

(10) Patent No.: US 9,783,669 B2
(45) Date of Patent: *Oct. 10, 2017

(54) POLYUREA MACROMER AND LATEXES THEREOF

(71) Applicants: Rohm and Haas Company, Philadelphia, PA (US); Dow Global Technologies LLC, Midland, MI (US)

(72) Inventors: Gregoire Cardoen, Blue Bell, PA (US); Ian J. Drake, Philadelphia, PA (US); Ralph C. Even, Blue Bell, PA (US); Andrew Hughes, Richboro, PA (US); Tianlan Zhang, Garnet Valley, PA (US); Thomas H. Kalantar, Midland, MI (US)

(73) Assignees: Rohm and Haas Company, Philadelphia, PA (US); Dow Global Technologies LLC, Midland, MI (US)

( * ) Notice: Subject to any disclaimer, the term of this patent is extended or adjusted under 35 U.S.C. 154(b) by 95 days.

This patent is subject to a terminal disclaimer.

(21) Appl. No.: 14/942,202

(22) Filed: Nov. 16, 2015

(65) Prior Publication Data

US 2016/0068673 A1    Mar. 10, 2016

Related U.S. Application Data

(63) Continuation of application No. 14/281,947, filed on May 20, 2014, now Pat. No. 9,217,081.

(60) Provisional application No. 61/826,153, filed on May 22, 2013.

(51) Int. Cl.

| | |
|---|---|
| C08L 33/24 | (2006.01) |
| C08L 33/06 | (2006.01) |
| C08F 283/00 | (2006.01) |
| C08L 33/08 | (2006.01) |
| C08G 18/75 | (2006.01) |
| C08G 18/76 | (2006.01) |
| C08G 18/32 | (2006.01) |
| C08G 18/63 | (2006.01) |
| C08F 290/06 | (2006.01) |

(52) U.S. Cl.
CPC .......... *C08L 33/08* (2013.01); *C08F 290/067* (2013.01); *C08G 18/3228* (2013.01); *C08G 18/633* (2013.01); *C08G 18/636* (2013.01); *C08G 18/755* (2013.01); *C08G 18/7671* (2013.01); *C08L 33/24* (2013.01); *C08L 2201/54* (2013.01)

(58) Field of Classification Search
CPC ....... C08L 33/24; C08L 33/08; C08G 18/755; C08G 18/7671; C08F 283/00
USPC ........................................................ 524/555
See application file for complete search history.

(56) References Cited

U.S. PATENT DOCUMENTS

| | | | |
|---|---|---|---|
| 5,648,515 A | 7/1997 | Lai | |
| 5,650,159 A * | 7/1997 | Lion | ........................ A61K 8/87 424/401 |
| 9,217,081 B2 * | 12/2015 | Cardoen | ............ C08G 18/3228 |

FOREIGN PATENT DOCUMENTS

| | | |
|---|---|---|
| CA | 2023661 A1 | 2/1991 |
| GB | 1488450 A | 10/1977 |

OTHER PUBLICATIONS

Brown et al., "Comparing and contrasting the properties of urethane/acrylic hybrids with those of corresponding blends of urethane dispersions and acrylic emulsions," Progress in Organic Coatings 52 (2005), pp. 73-84.
Lee et al., "Synthesis and Properties of Aqueous Polyurethane/Polytert-butylacrylate Hybrid Dispersions," Journal of Polymer Research, 12 (2005), pp. 271-277.
Adler et al., "Polyurethane macromers-new building blocks for acrylic hybrid emulsions with outstanding performance,"Progress in Organic Coatings, vol. 43, No. 4, 2001, pp. 251-257.
Hirose et al., "The structure and properties of acrylic-polyurethane hybrid emulsion," Progress in Organic Coatings, vol. 38, No. 1, 2000, pp. 27-34.
Takasu et al., "Preparation of colored latex with polyurea shell by miniemulsion polymerization," Colloid and Polymer Science;. vol. 283, No. 7, 2005, pp. 805-811.

* cited by examiner

*Primary Examiner* — Deve E Valdez
(74) *Attorney, Agent, or Firm* — Reid S. Willis

(57) ABSTRACT

The present invention is a composition comprising a) a stable aqueous dispersion of polymer particles having one or more structural units of i) a polyurea macromer; and ii) an acrylate, a methacrylate, a vinyl ester, or a styrene monomer, or a combination thereof; and/or b) an aqueous mixture of a i) polyurea macromer polymer particles; and b) acrylate, methacrylate, vinyl ester, or styrenic polymer particles, or a combination thereof, wherein the polyurea macromer is characterized by the following formula I:

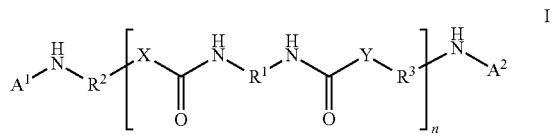

where $A^1$, $A^2$, $R^1$, $R^2$, and $R^3$ are as defined herein. Compositions prepared using the compound of the present invention can be used to form coatings with excellent balance of low temperature film formation, hardness, and flexibility.

16 Claims, No Drawings

POLYUREA MACROMER AND LATEXES THEREOF

BACKGROUND OF THE INVENTION

The present invention relates to a polyurea macromer (PUM), which is useful in the preparation of aqueous dispersions of a variety of emulsion polymers.

Aqueous dispersions of acrylic polymers and polyurethanes generally serve similar market segments. Polyurethane dispersions (PUDs) typically offer superior balance of film formation, flexibility, and hardness over acrylic dispersions in coatings applications, and a superior balance of toughness, abrasion resistance, and mechanical flexibility in adhesives applications. Acrylics, on the other hand, can provide exceptional exterior durability and chemical resistance more cost effectively than PUDs.

The different performance profiles of PUDs and acrylics can be attributed to significant differences in their polymer chain architecture. The pressure to balance cost and performance has lead PUD users to evaluate PUD/acrylic blends and hybrid, with limited success. (See, for example, R. A. Brown et al., "Comparing and contrasting the properties of urethane/acrylic hybrids with those of corresponding blends of urethane dispersions and acrylic emulsions," *Progress in Organic Coatings* 2005, 52 (1), 73-84; and H. T. Lee et al., "Synthesis and properties of aqueous polyurethane/polytert-butylacrylate hybrid dispersions," *Journal of Polymer Research* 2005, 12 (4), 271-277; and U.S. Pat. No. 5,650,159.)

It would be an advance in the art to find a cost effective way of achieving the desired properties of acrylics and PUDs.

SUMMARY OF THE INVENTION

The present invention is a compound of the following formula I:

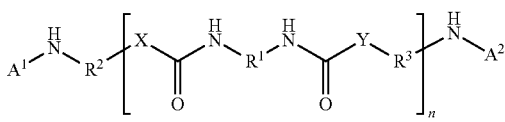

wherein n is 1 to 20;
$R^1$, $R^2$, and $R^3$ are each independently a $C_2$-$C_{20}$ alkanediyl group, a $C_3$-$C_{20}$ cycloalkanediyl group, a $C_6$-$C_{20}$ arenediyl group, or a $C_7$-$C_{20}$ aralkanediyl group;
X and Y are independently O or $NR^4$, wherein $R^4$ is H or $C_1$-$C_6$-alkyl, with the proviso that at least one of X and Y is NH;
at least one of $A^1$ and $A^2$ is —C(O)—(Z)$_m$—$R^5$; —CH$_2$CH(OH)$R^6$; —C$R^7$=CH—C(O)O(CH$_2$)$_p R^8$; —C(O)—Y'—(CH$_2$)$_p R^9$; or CH$_2$—CH$_2$—C(O)—O—$R^{10}$;
wherein each $R^5$ is independently a $C_2$-$C_{20}$ alkyl group, a $C_3$-$C_{20}$ cycloalkyl group, a $C_6$-$C_{20}$ aryl group, or a $C_7$-$C_{20}$ aralkyl group, with the proviso that at least one $R^5$ is functionalized with a carboxylic acid group or a polymerizable olefin group or both;
each $R^6$ is independently —CH$_2$-acrylate, —CH$_2$-methacrylate, or —(CH$_2$)$_p$—COOH;
each $R^7$ is independently H or CH$_3$;
each $R^8$ is independently an acrylate group, a methacrylate group, or COOH;
each $R^9$ is independently an acrylate group or a methacrylate group;
each $R^{10}$ is independently H or —CH$_2$CH=CH$_2$;
Y' is O or $NR^4$;
m is 0 or 1;
each p is independently from 2 to 6; and
the compound has an $M_n$ in the range of 500 to 8,000 Daltons.

Coatings of acrylic emulsion polymers functionalized with the compound of the present invention exhibit an excellent balance of low temperature film formation, hardness, and flexibility.

DETAILED DESCRIPTION OF THE INVENTION

The present invention is a compound of the following formula I:

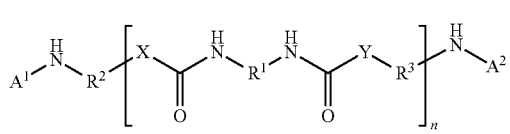

wherein n is 1 to 20;
$R^1$, $R^2$, and $R^3$ are each independently a $C_2$-$C_{20}$ alkanediyl group, a $C_3$-$C_{20}$ cycloalkanediyl group, a $C_6$-$C_{20}$ arenediyl group, or a $C_7$-$C_{20}$ aralkanediyl group;
X and Y are independently O or $NR^4$, wherein $R^4$ is H or $C_1$-$C_6$-alkyl, with the proviso that at least one of X and Y is NH;
at least one of $A^1$ and $A^2$ is —C(O)—(Z)$_m$—$R^5$; —CH$_2$CH(OH)$R^6$; —C$R^7$=CH—C(O)O(CH$_2$)$_p R^8$; —C(O)—Y'—(CH$_2$)$_p R^9$; or CH$_2$—CH$_2$—C(O)—O—$R^{10}$;
wherein each $R^5$ is independently a $C_2$-$C_{20}$ alkyl group, a $C_3$-$C_{20}$ cycloalkyl group, a $C_6$-$C_{20}$ aryl group, or a $C_7$-$C_{20}$ aralkyl group, with the proviso that at least one $R^5$ is functionalized with a carboxylic acid group or a polymerizable olefin group or both;
each $R^6$ is independently —CH$_2$-acrylate, —CH$_2$-methacrylate, or —(CH$_2$)$_p$—COOH;
each $R^7$ is independently H or CH$_3$;
each $R^8$ is independently an acrylate group, a methacrylate group, or COOH;
each $R^9$ is independently an acrylate group or a methacrylate group;
each $R^{10}$ is independently H or —CH$_2$CH=CH$_2$;
Y' is O or $NR^4$;
m is 0 or 1;
each p is independently from 2 to 6; and
the compound has an $M_n$ in the range of 500 to 8,000 Daltons.

Preferably, X and Y are each NH; preferably the compound has an $M_n$ in the range of from 1000 Daltons to 6000 Daltons, more preferably to 3000 Daltons.

Preferably $R^1$ is 1,6-hexanediyl,

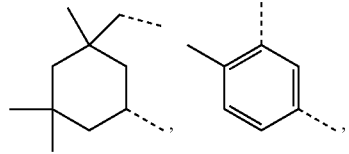

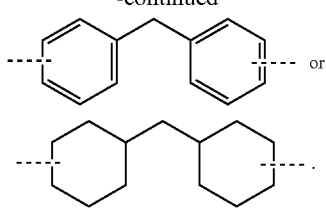 or

Preferably, $R^2$ and $R^3$ are each independently $C_2$-$C_{10}$ linear or branched alkanediyl groups, benzenediyl groups, benzenedimethanediyl groups, or cyclohexanediyl groups; more preferably, $R^2$ and $R^3$ are each independently linear or branched $C_3$-$C_{10}$-alkanediyl groups; most preferably, $R^2$ and $R^3$ are each —$CH_2CH(CH_3)$— groups.

Preferably, m is 0; preferably n is 2 to 10.

It is preferable that each of the $A^1$ and $A^2$ groups is functionalized with a carboxylic acid group, a polymerizable olefin group, or both. If only one of $A^1$ and $A^2$ is functionalized with a carboxylic acid group and/or a polymerizable olefin group, the other of $A^1$ and $A^2$ may be the unreacted primary amine or a remnant of an aliphatic, cycloaliphatic, aromatic compound optionally containing O, N, or S functionality, having a molecular weight of not more than 500, and is reactive with a primary amine (e.g., a $C_1$-$C_{20}$ alkyl halide) or an isocyanate (e.g., a phenol or a $C_1$-$C_{20}$ alcohol) Examples of suitable $R^5$ groups include:

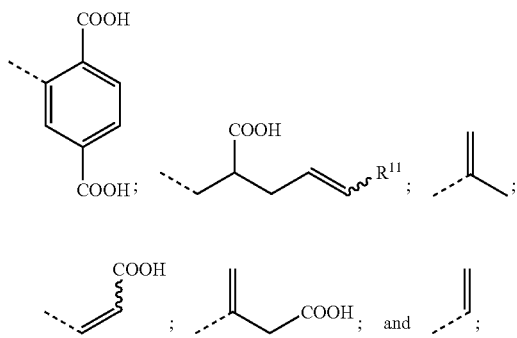

where $R^{11}$ is a linear or branched $C_1$-$C_{15}$-alkyl group; preferably a $C_8$-$C_{10}$-linear or branched alkyl group.

More preferred $R^5$ groups include:

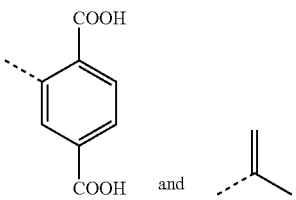

Preferably, $R^6$ is —$CH_2$-methacrylate or —$CH_2CH_2$—COOH, with —$CH_2$-methacrylate being more preferred; $R^7$ is preferably H; $R^8$ is preferably methacrylate or COOH; $R^9$ is preferably methacrylate; and p is preferably 2 or 3.

A preferred compound is represented by the following formula II:

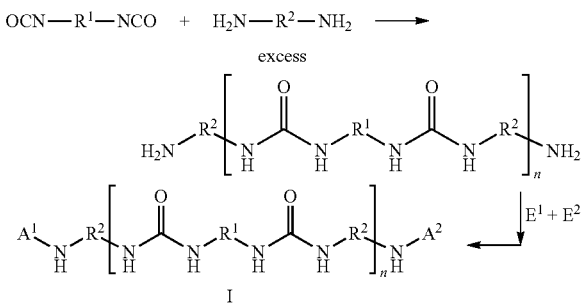

Compound I (where m=0; X and Y are each NH; $R^2$=$R^3$; and each $R^4$, together with the carbon atoms to which they are attached, form a carbonyl group) can be prepared as shown in Scheme 1:

Scheme 1

OCN—$R^1$—NCO + $H_2N$—$R^2$—$NH_2$ $\xrightarrow{\text{excess}}$

In a first step, a diisocyanate is reacted with a stoichiometric excess of a diamine to form a polyurea diamine macromer intermediate, the molecular weight of which can be controlled by the stoichiometry of the starting materials. In a second step, the intermediate is reacted with one or more electrophiles, preferably two distinct electrophiles ($E^1$ and $E^2$), preferably added in separate steps, to form the PUM with end groups $A^1$ and $A^2$. At least one of $E^1$ and $E^2$ is functionalized with a carboxylic acid group or a polymerizable olefinic group or both. Examples of suitably functionalized electrophiles include anhydrides such as 1,2,4-benzenetricarboxylic acid anhydride, 2-(dodecen-1-yl) succinic anhydride, succinic anhydride, maleic anhydride, methacrylic anhydride, acrylic anhydride, and itaconic anhydride; acrylate and methacrylate epoxides such as glycidyl methacrylate; acrylol and methacrylol halides such as methacrylol chloride; and alkyl halides such as bromopentane and bromohexane.

$E^1$ and $E^2$ are preferably anhydrides added in separate steps.

Examples of suitable diisocyanates include isophorone diisocyanate (5-isocyanato-1-(isocyanatomethyl)-1,3,3-trimethyl cyclohexane), 1,6-hexamethylene diisocyanate, 2,4-diisocyanato-1-methyl-benzene, and methylene diphenyl diisocyanates.

Examples of suitable diamines include $C_2$-$C_{20}$ alkanediamines such as 1,2-ethanediamine, 1,2-propanediamine, 1,3-propanediamine, 1,6-hexanediamine, and 1,8-octanediamine; $C_3$-$C_{20}$-cycloalkanediamines such as 1,4-cyclohexanediamine and isophoronediamine; $C_6$-$C_{20}$-arenediamines such as 1,4-diaminobenzene; and $C_7$-$C_{20}$-aralkanediamines such as 1,4-phenylenedimethanamine and 4,4'-methylenedianiline.

The diamine is preferably contacted with the diisocyanate in the presence of a polar solvent such as dimethylacetamide or isopropanol to produce an intermediate with a number average molecular weight preferably from 300, more preferably from 500, and most preferably from 1000 Daltons, to preferably 7000 Daltons, more preferably to 5000 Daltons, and most preferably to 3000 Daltons.

It is also possible to contact an excess of the diisocyanate with the diamine to obtain a second subclass of intermediate that can be further reacted with one or more nucleophiles, preferably two nucleophiles ($Nuc^1$ and $Nuc^2$), preferably added in separate steps, to form the intermediate as shown in Scheme 2. At least one of the nucleophiles is functionalized with a carboxylic acid group or a polymerizable olefinic group or both. Examples of suitably functionalized nucleophiles include hydroxyethyl methacrylate, hydroxypropyl methacrylate, and 3-hydroxypropanoic acid.

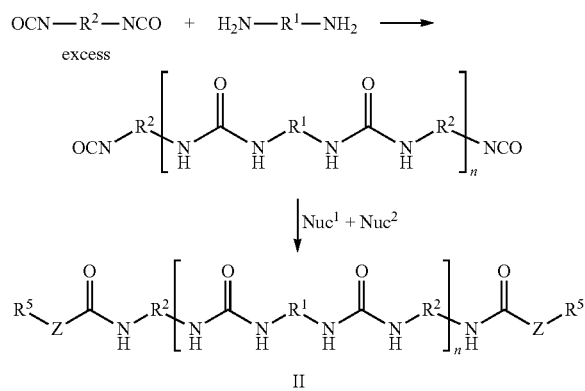

The PUM of the present invention can be conveniently contacted with one or more ethylenically unsaturated monomers such as acrylate, methacrylate, a vinyl ester, and styrenic monomers to form a PUM-containing emulsion polymer.

Examples of suitable acrylate monomers include ethyl acrylate, butyl acrylate, 2-propylheptyl acrylate, and 2-ethylhexyl acrylate; examples of suitable methacrylates include methyl methacrylate, butyl methacrylate, acetoacetoxyethyl methacrylate, and ureido methacrylate; examples of suitable vinyl esters include vinyl acetate and vinyl esters of neodecanoic acid; example of suitable styrenics include styrene, vinyl toluenes, and α-methylstyrene. Other ancillary monomers may be used to make the PUM-containing emulsion polymer, including acrylamides, acrylonitrile; carboxylic acid monomers and salts thereof (e.g., methacrylic acid, acrylic acid, and itaconic acid, and salts thereof); sulfur acid monomers and salts thereof (e.g., 2-acrylamido-2-methylpropanesulfonic acid and styrene sulfonic acid and salts thereof); and phosphorus acid monomers and salts thereof (e.g., phosphoethyl methacrylate and methacryloyloxyethyl phosphonic acid and salts thereof.)

The contact can occur during or after, preferably during the polymerization of the other monomers to form a copolymer of the PUM and the other monomers or a non-covalently bonded mixture of the PUM and the emulsion copolymer, or a combination thereof. Accordingly, in a second aspect, the present invention is a composition comprising a) a stable aqueous dispersion of polymer particles having one or more structural units of i) the PUM; and ii) an acrylate, a methacrylate, a vinyl ester, or a styrene monomer, or a combination thereof; and/or b) an aqueous mixture of i) PUM polymer particles; and ii) acrylate, methacrylate, vinyl ester, or styrenic polymer particles, or a combination thereof. As used herein, the term "structural unit" refers to the remnant of the monomer or macromer after polymerization. Thus, a structural unit of a macromer with $A^2$=—C(O)—$R^5$ where $R^5$ is

is illustrated as follows:

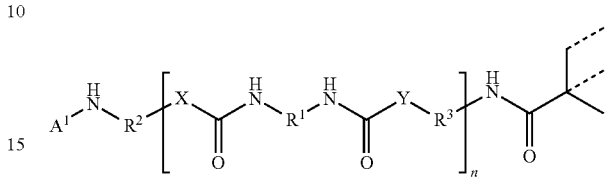

wherein the dotted lines are the points of attachment to the polymer backbone.

A non-covalently bonded mixture of the PUM and the emulsion copolymer can be prepared by contacting a) an aqueous dispersion of a base-neutralized PUM having a solids content preferably in the range of 20 to 50 weight percent, with b) the emulsion copolymer, which is preferably adjusted to a basic pH. The resultant mixture is preferably a nanodispersion with Z-average particle size preferably in the range of from 10 nm to 500 nm, more preferably to 100 nm, and most preferably to 50 nm. The aqueous dispersion of the base-neutralized PUM is preferably prepared by contacting together a base, preferably NaOH or KOH, with the PUM in the presence of water at and advanced temperature, preferably in the range of 60° C. to 100° C.

Preferably, the polymer particles comprise from 2 to 50, more preferably to 30 weight percent structural units of the PUM and from 50, more preferably from 70 to 98 weight percent structural units of the acrylate, the methacrylate, the vinyl ester or the styrene, or combinations thereof. Many properties of the final polymer can be tuned by changing the chemistry used to build the macromer. The approach described herein provides a convenient way of incorporating PUD features into an acrylic backbone. Specifically, the macromer of the present invention provides a useful way to tune hydrogen-bonding strength, hydrophilicity/hydrophobicity balance of the colloid, and location of the macromer in the latex particle. This approach is useful to solve compatibility issues observed in PUD/acrylic blends and results in an improved minimum film forming temperature/hardness balance.

This latter property is critical as more and more coatings move towards zero volatile organic compound (0 VOC) requirements.

EXAMPLES

Intermediate 1

Synthesis of Polyurea Oligomer Precursor, $M_n$=1480 Daltons

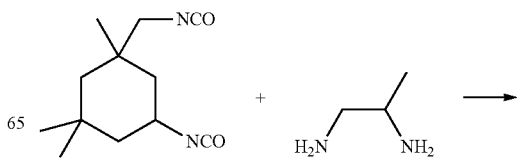

-continued

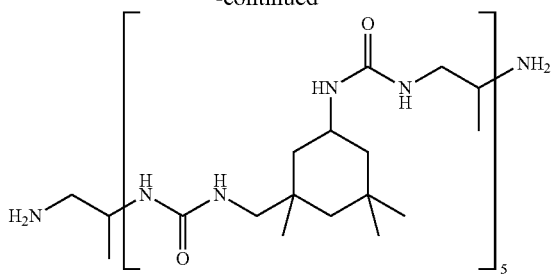

Dimethylacetamide (DMAc, 300 mL) and 1,2-propanediamine (1,2-PDA, 16 g) were charged under $N_2$ into a 1-L, 4-neck flask equipped with an overhead stirrer, a condenser, and an addition funnel. Isophorone diisocyanate (IPDI, 40 g) was transferred to the addition funnel and added to the reaction flask over 1 h while maintaining the temperature at 30° C. with an ice bath. The oligomer solution was used as is for the next step.

Intermediate 2

Synthesis of Polyurea Oligomer Precursor, $M_n$=5040 Daltons

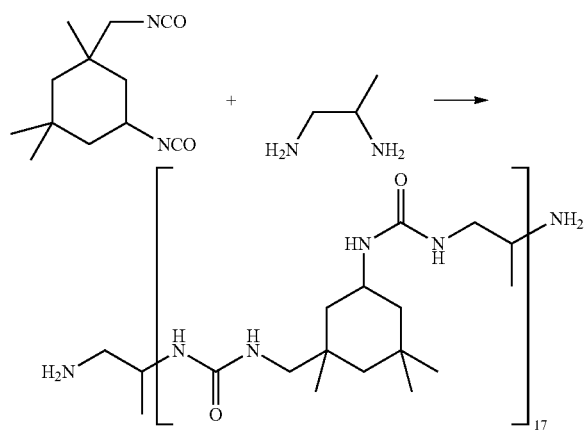

DMAc (425.75 g) and 1,2-PDA (24 g) were charged under $N_2$ into a 1-L, 4-neck flask equipped with an overhead stirrer, a condenser, and an addition funnel. The solution was stirred at 250 rpm at room temperature. IPDI (67.91 g) was transferred to the addition funnel and added to the react over 18 min. When the temperature exceeded 30° C. the reaction vessel was blown with cold air to remove heat. Over the course of the reaction the solution temperature reached 45.6° C. When the addition was finished, the funnel was rinsed into the reaction flask using 10.7 g of DMAc.

Intermediate 3

Synthesis of Polyurea Oligomer Precursor, $M_n$=1620 Daltons

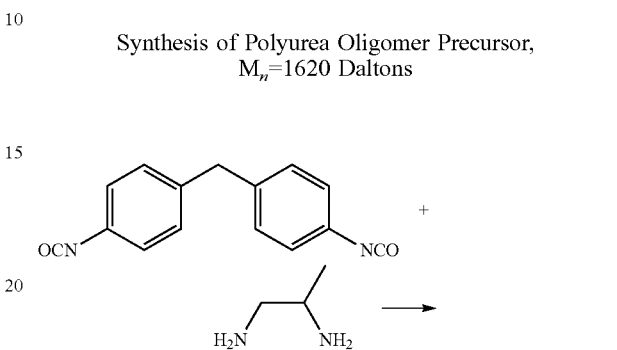

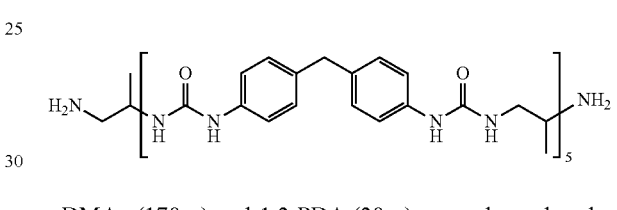

DMAc (170 g) and 1,2-PDA (20 g) were charged under $N_2$ into a 500-mL, 4-neck flask equipped with an overhead stirrer, a condenser and an addition funnel. The solution was stirred at 300 rpm at 13° C. Separately, ISONATE™ OP-50 MDI (A Trademark of The Dow Chemical Company or its Affiliates, 55 g) and DMAc (55 g) was prepared and transferred to the addition funnel and added to the reaction flask over 13 min. Over the course of the reaction the solution temperature reached 24° C., at which time stirring was increased to 420 rpm. Additional DMAc (201 g) was added to the final mixture.

Example 1

Synthesis of Polyurea Macromer, $M_n$=1960 Daltons

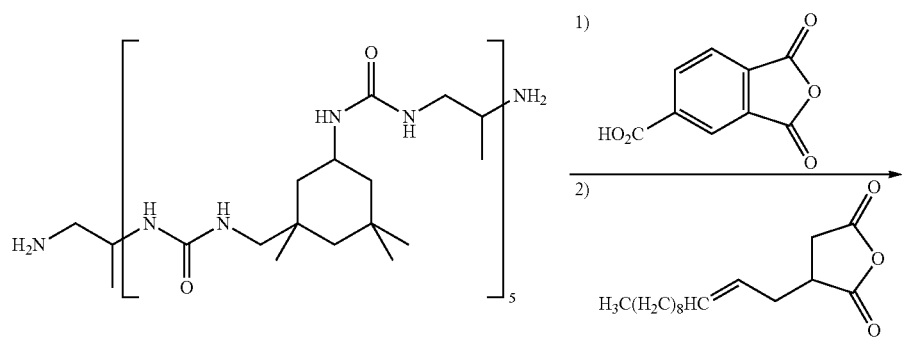

-continued

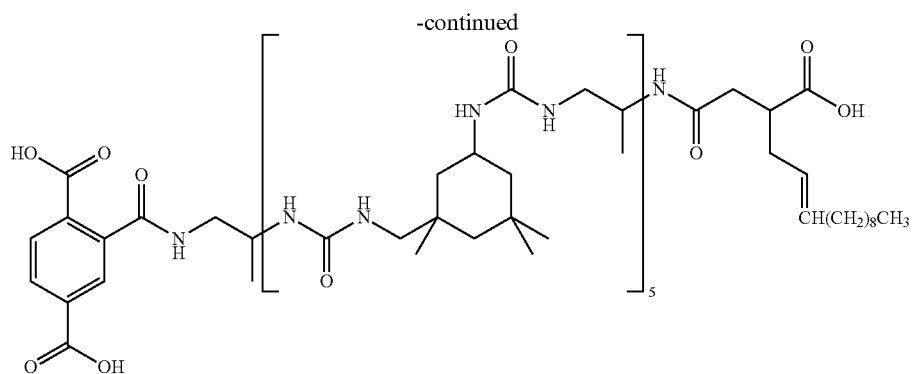

Trimellitic anhydride (8.65 g) was dissolved in dry dimethylformamide (70 mL, DMF) and added to a reaction flask containing the solution of Intermediate 1 in DMAc at 50° C. over 30 min. A solution of dodecen-1-yl succinic anhydride (14.73 g) in DMAc (50 mL) was then added dropwise to the reaction flask over 15 min while temperature was maintained at 50° C. Upon completion of the addition, the reaction mixture was cooled to room temperature, filtered, and precipitated with cold acetone. The coarse solid was redissolved in methanol and precipitated a second time in cold acetone. After filtration, the coarse white solid was dried at 35° C. in vacuo.

Example 2

Synthesis of Polyurea Macromer $M_n$=5370 Daltons

Into a 1 L, 4-neck flask equipped with an overhead stirrer and a condenser was added Intermediate 2 (112.17 g). The solution was stirred at 250 rpm and the reaction was heated to 50° C. Maleic anhydride (0.488 g) was added over 10 min followed by addition of trimellitic anhydride (1.13 g) over 2 min. The reaction was cooled to room temperature and was precipitated in acetone at −10° C. The sample was then filtered, transferred to a graduated jar, and filled to a total volume of 300 mL with MeOH. The slurry was warmed to 50° C. and the solid dissolved over 1 h. The sample was precipitated again in cold acetone. After filtration, the coarse white solid was dried at 35° C. in vacuo.

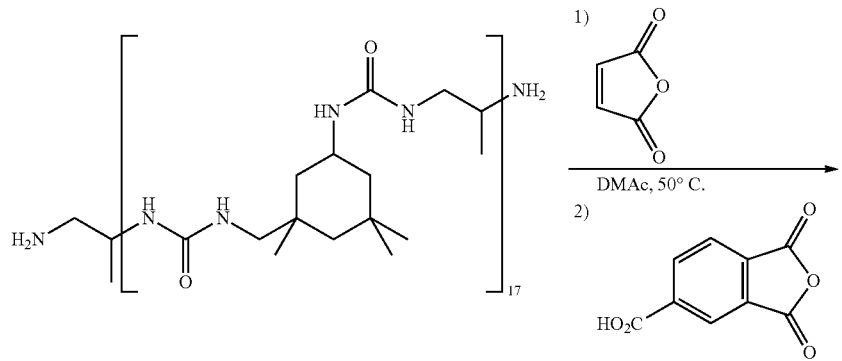

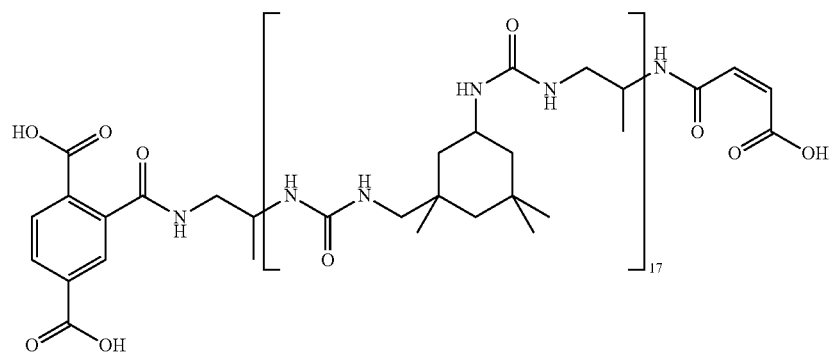

Example 3

Synthesis of Polyurea Macromer $M_n$=1800 Daltons

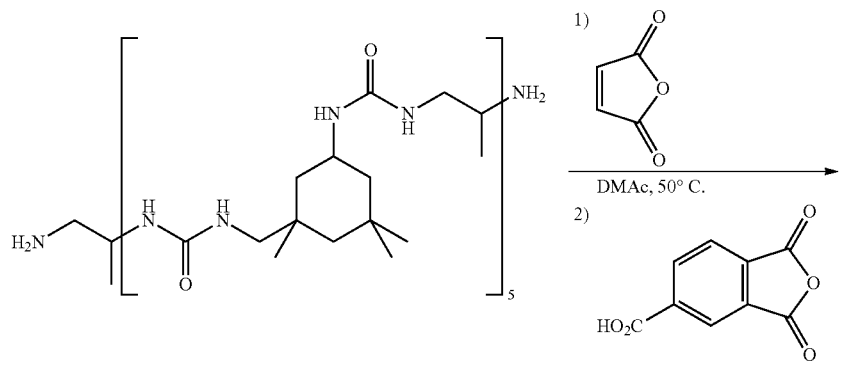

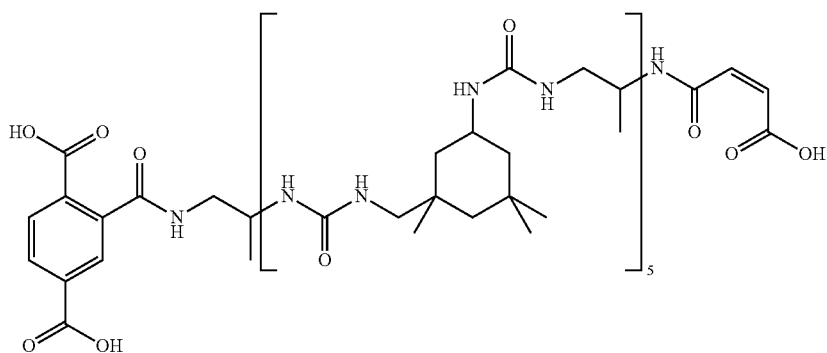

Into a 1-L, 4-neck flask equipped with an overhead stirrer and a condenser was added a compound prepared as Intermediate 1 (400 g). The solution was stirred at 250 rpm and the reaction was heated to 50° C. Maleic anhydride (6.21 g) was added all at once followed by addition of trimellitic anhydride (12.7 g) all at once. The reaction was cooled to room temperature and was precipitated in acetone at −10° C. The sample was then filtered, transferred to a graduated jar, filled to a total volume of 400 mL with MeOH and stirred overnight to dissolve. The sample was precipitated again in cold acetone. After filtration, the coarse white solid was dried at 35° C. in vacuo.

Example 4

Synthesis of Polyurea Macromer $M_n$=2100 Daltons

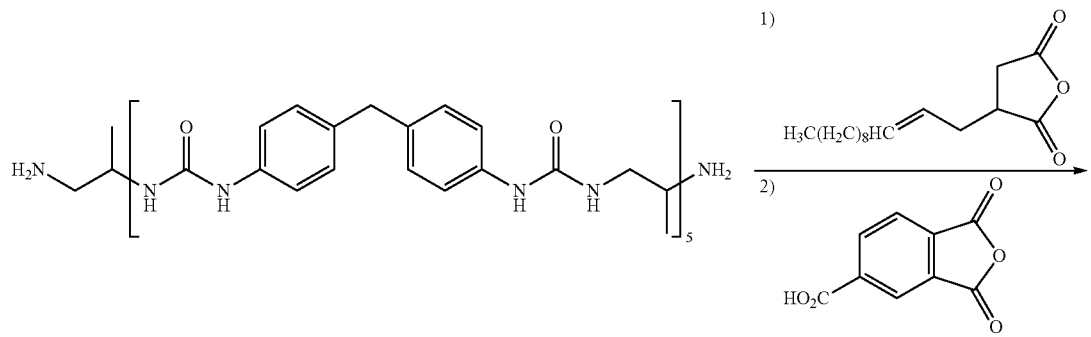

-continued

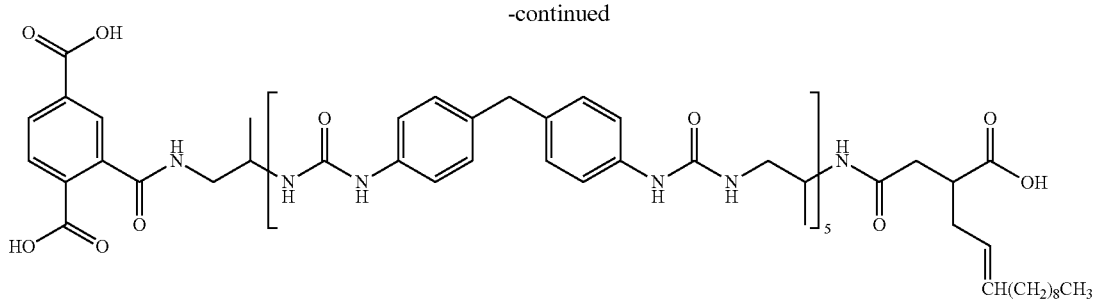

Intermediate 3 (142 g, 15% oligomer), was charged in a 500-mL, 4-neck flask equipped with an overhead stirrer and a condenser. The solution was stirred at 350 rpm and the reaction vessel was heated to 50° C. Dodecen-1-yl succinic anhydride (4.23 g) was added to the vessel, rinsed in with DMAc (24.0 g). The reaction temperature was held constant for 20 min. Trimellitic anhydride (3.07 g) was added to DMAc (21.0 g) and was then added over 10 min to the reactor at 50° C., after which time the reaction was cooled to room temperature and the product was precipitated by slow dripping into 4 L of acetone at room temperature. The sample was then filtered and rinsed with acetone and the filter cake was transferred to a jar and dried at 35° C. in vacuo.

the reaction was heated to 50° C. Trimellitic anhydride (6.12 g) was added to the reactor as a powder and dissolved rapidly over a few minutes. After 30 min, the reaction was cooled to room temperature and was precipitated in cold acetone. The sample was then filtered, transferred to a graduated jar, and filled to a total volume of 400 mL with MeOH. The slurry was warmed to 50° C. and the solid dissolved over 1 h. The sample was precipitated again in cold acetone. After filtration, the coarse white solid was dried at 35° C. in vacuo.

Dynamic light scattering was used to measure Z-average particle size in the following examples.

Example 6

Polyurea Macromer Stabilized Binder (60 BA/20 MMA/20 PUM)

Into a 1-L, 4-neck flask equipped with an overhead stirrer and a condenser was added the PUM as prepared in Example Example 5

Synthesis of Polyurea Macromer $M_n$=1900 Daltons

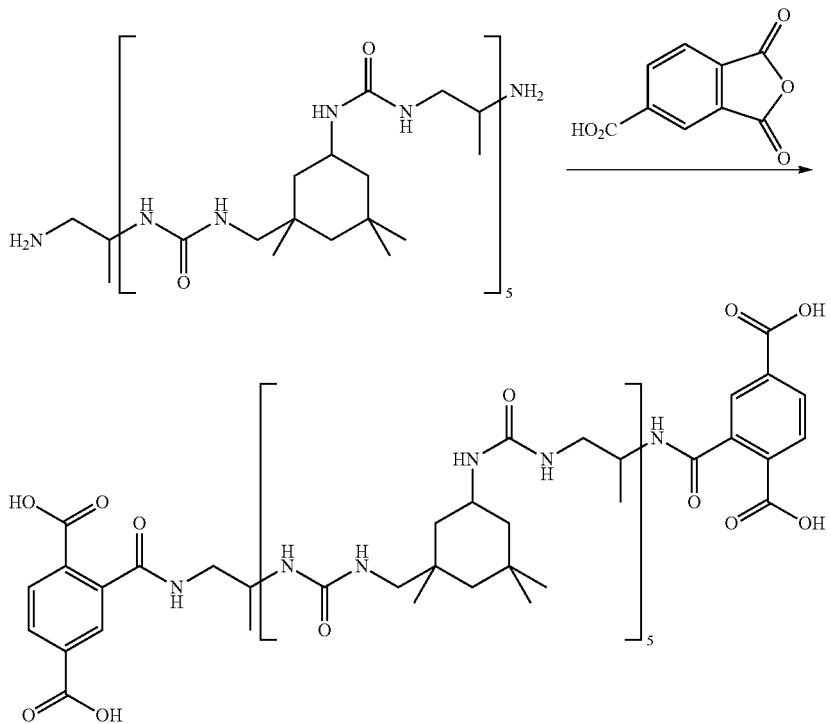

Into a 1-L, 4-neck flask equipped with an overhead stirrer and a condenser was added Intermediate 1 (100 g) followed by DMF (46.27 g). The solution was stirred at 250 rpm and 1 (20 g), NaOH (50 wt. % in water, 3 g) and deionized water (90 g). The reactor was heated to 85° C. for 30 min with agitation at 120 rpm under $N_2$. Ammonium persulfate (0.52 g) was dissolved in deionized water (20 g) was added in a single shot to the reactor. The temperature decreased to 82° C. and was allowed to increase to 85° C. over 2 min. A butyl acrylate/methyl methacrylate monomer mixture (BA/MMA (60 g/20 g)) was added to the kettle over 1 h, after which time deionized water (5 g) was added as a rinse. The contents of the reactor were held at temperature for 30 min followed by cooling to 65° C. over 20 min. Next, t-amyl hydroperoxide (0.1 g in 1 mL of water) and a solution of $FeSO_4.7H_2O$/tetrasodium ethylenediamine tetraacetic acid (0.61 mg of each in 1 mL deionized water), were added directly to the kettle. Subsequently, Bruggolite FF6 M reducing agent (0.045 g in 3 mL of DI water) was added over 30 min. The latex was filtered through a 100-mesh filter and the coagulum was isolated and weighed. The measured particle size was 108 nm, final pH was 8.7 and the solids were 40.6%. A Minimum Film Formation Temperature (MFFT) below 0° C. and a Koenig hardness of 26 s were obtained on a dried film from the emulsion. Storage modulus of the material at 140° C. as measured by Dynamic Mechanical Analysis (DMA) was 100 MPa.

Example 7

Polyurea Macromer Stabilized Binder (60 BA/20 MMA/20 PUM)

Into a 500-mL, 4-neck flask equipped with an overhead stirrer and a condenser was added PUM as prepared in Example 2 (9 g), NaOH (50 wt. % in water, 0.828 g) and deionized water (46.57 g). The reactor was heated to 85° C. for 30 min with agitation at 120 rpm under $N_2$. Ammonium persulfate (0.232 g) was dissolved in deionized water (6 g) and was added in a single shot to the reactor. The temperature decreased to 82° C. and was allowed to increase to 85° C. over 2 min. A butyl acrylate/methyl methacrylate monomer mixture (BA/MMA (27 g/9 g)) was added to the kettle over 1 h. The contents of the reactor were held at temperature for 30 min followed by cooling to 65° C. over 20 min. Next, t-amyl hydroperoxide (0.045 g in 1.75 mL of water) and a solution of $FeSO_4.7H_2O$/tetrasodium ethylenediamine tetraacetic acid (0.28 mg of each in 1 mL deionized water), were added directly to the kettle. Subsequently, formaldehyde-free reducing agent, Bruggolite FF6 M (0.02 g in 1.75 mL of DI water) was added over 30 min. The latex was filtered through a 100-mesh filter and the coagulum was isolated and weighed. The measured particle size was 113 nm, final pH was 7.14 and the solids were 41.49%. A Minimum Film Formation Temperature (MFFT) below 0° C. and a Koenig hardness of 42 s were obtained on a dried film from the emulsion.

Example 8

Polyurea Macromer Stabilized Binder (60 BA/28.9 MMA/11.1 PUM)

Into a 500-mL, 4-neck flask equipped with an overhead stirrer and a condenser was added PUM as prepared in Example 4 (4.5 g), NaOH (50 wt. % in water, 0.71 g) and deionized water (46.57 g). The reactor was heated to 85° C. for 30 min with agitation at 120 rpm under $N_2$. Ammonium persulfate (0.232 g) was dissolved in deionized water (6 g) and was added in a single shot to the reactor. The temperature decreased to 82° C. and was allowed to increase to 85° C. over 2 min. A butyl acrylate/methyl methacrylate monomer mixture (BA/MMA (27 g/11.7 g)) was added to the kettle over 1 h. The contents of the reactor were held at temperature for 30 min followed by cooling to 65° C. over 20 min. Next, t-amyl hydroperoxide (0.045 g in 1.75 mL of water) and a solution of $FeSO_4.7H_2O$/tetrasodium ethylenediamine tetraacetic acid (0.28 mg of each in 1 mL deionized water), were added directly to the kettle. Subsequently, Bruggolite FF6 M reducing agent (0.02 g in 1.75 mL of DI water) was added over 30 min. The latex was filtered through a 100-mesh filter and the coagulum was isolated and weighed. The measured particle size was 103 nm, final pH was 6.66 and the solids were 41.63%. A Minimum Film Formation Temperature (MFFT) below 0° C. and a Koenig hardness of 5.6 s were obtained on a dried film from the emulsion.

Example 9

Polyurea Macromer Stabilized Binder (60 BA/20 MMA/20 PUM)

Into a 500-mL, 4-neck flask equipped with an overhead stirrer and a condenser was added PUM as prepared in Example 4 (9 g), NaOH (50 wt. % in water, 1.21 g) and deionized water (46.57 g). The reactor was heated to 85° C. for 30 min with agitation at 120 rpm under $N_2$. Ammonium persulfate (0.232 g) dissolved in deionized water (6 g) was added in a single shot to the reactor. The temperature decreased to 82° C. and was allowed to increase to 85° C. over 2 min. A butyl acrylate/methyl methacrylate monomer mixture (BA/MMA (27 g/9 g)) was added to the kettle over 1 h. The contents of the reactor were held at temperature for 30 min followed by cooling to 65° C. over 20 min. Next, t-amyl hydroperoxide (0.045 g in 1.75 mL of water) and a solution of $FeSO_4.7H_2O$/tetrasodium ethylenediamine tetraacetic acid (0.28 mg of each in 1 mL deionized water), were added directly to the kettle. Subsequently, Bruggolite FF6 M reducing agent (0.02 g in 1.75 mL of DI water) was added over 30 min. The latex was filtered through a 100-mesh filter and the coagulum was isolated and weighed. The measured particle size was 182 nm, final pH was 6.35 and the solids were 42.43%. A Minimum Film Formation Temperature (MFFT) of 3° C. and a Koenig hardness of 39 s were obtained on a dried film from the emulsion. Storage modulus of the material at 140° C. as measured by Dynamic Mechanical Analysis (DMA) was 100 MPa.

Comparative Example 1

Control Emulsion 1 (60BA/36.8MMA/3.2MAA//0.3 DS-4)

A process similar to that described for the preparation of the polyurea macromer-stabilized emulsion of Example 5 was followed. In this comparative example, sodium dodecylbenzene sulfonate (1.333 g, 22.5% active, DS-4), methacrylic acid (3.23 g), NaOH (50 wt. % solution, 0.54 g) and water were initially added to the flasks and heated to 85° C. under $N_2$. The rest of the reaction was identical to the PUM-stabilized emulsion synthesis. The measured particle size was 105 nm, final pH was 6 and the solids were 43.1%. An MFFT of 7° C. and a Koenig hardness of 5.6 s was obtained on a dried film from the emulsion. Storage modulus of the material at 140° C. as measured by DMA was 0.1 MPa.

Comparative Example 2

Control Emulsion 2 (60 BA/38 MMA/2 MAA)

A monomer emulsion (ME) was prepared by adding water (127 g), FES-32 surfactant (9.52 g of a 30% FES-32 solution), butyl acrylate (162 g), methyl methacrylate (102.5 g) and methacrylic acid (5.5 g). An ME seed (9.9 g) was removed from the ME. In the reactor kettle, water (103 g), FES-32 surfactant (1.9 g of a 30% FES-32 solution), and sodium carbonate buffer (5.1 g of a 5.6% solution in DI water) were added and the kettle was heated to 89° C. At 89° C., the ME seed (9.9 g) and ammonium persulfate (0.99 g in 3.0 g of deionized water) were added sequentially to the reactor in two separate shot additions. After 2 min, the rest of the ME and ammonium persulfate (0.15 g in 11.9 g of deionized water) were fed to the reactor over 90 min. The reactor was temperature was maintained isothermal at 89° C. over the course of the feed. Once the ME and ammonium persulfate feeds were complete, deionized water (5.0 g) was add to the ME container to rinse the remaining monomer into the reactor. The reactor temperature was then allowed to cool to 70° C. over 10 min. At 70° C., a solution of $FeSO_4 \cdot 7H_2O$ (1.95 g of a 0.15 wt. % deionized water solution) was combined with additional deionized water (2.6 g) and added directly to the kettle. The reactor kettle was allowed to further cool to 60° C. over 15 min. After cooling the reactor to 60° C., an emulsified solution of t-amyl hydroperoxide (0.1 g), FES-32 surfactant (0.05 g of a 30% FES-32 solution) and deionized water (1.49 g) was added directly to the kettle. Subsequently, isoascorbic acid (0.054 g in 3.0 g of deionized water) was added over 15 min. The latex was filtered through a 100-mesh filter and the coagulum was isolated and weighed. The measured particle size was 120 nm, the final pH was 4.5 and the solids content was 49.5%. An MFFT of 0° C., a Koenig hardness of 2.8 s and water whitening value of 0 after 20 min of water exposure were measured on a dried film from the emulsion.

Water whitening is a qualitative test in which a droplet of water is placed onto a dry clear film of the emulsion. After a certain period of time, the water droplet is whipped out of the surface and the film inspecting visually for whitening (0 is no whitening while 10 is complete whitening of the film). Non-covalently bonded mixtures of PUM and binder are described in Examples 10 and 11.

Example 10

NaOH-Neutralized Blend PUM and an Emulsion Polymer

A compound as prepared in Example 3 (11.0 g) was added to deionized water (24.2 g) in a glass vial containing a magnetic stir bar, followed by addition of NaOH (50 wt. % solution, 1.1 g). The vial was sealed and the mixture was heated with stirring to 85° C. for 1 h to obtain a stock dispersion of NaOH-neutralized PUM nanoparticles with a pH was 12.0, a solids content of 30.3% and an average particle size of 21.0 nm. $NH_4OH$ solution (0.13 g of a 28% $NH_4OH$ solution) was added to control emulsion 2 (23.05 g) to bring the pH of the control binder to 9.1. A portion of the stock PUM nanoparticle dispersion (9.5 g) was then added to the pre-neutralized control binder 2 ((60 BA/38 MMA/2 MAA, 23.18 g). The final pH was found to be 9.1 and the solids content was 43.4%. An MFFT of 0° C., a Koenig hardness of 21.0 s and water whitening value of 10 after 20 min of water exposure were obtained on a dried film from the emulsion.

Example 11

$NH_4OH$-Neutralized PUM and an Emulsion Polymer

A compound as prepared in Example 3 (10.05 g) was added to deionized water (14.1 g) in a glass vial containing a magnetic stir bar followed by addition of $NH_4OH$ solution (9.0 g of a 28% $NH_4OH$ solution). The vial and sealed and the mixture was heated with stirring to 85° C. for 1 h. The vial cap was loosened and the mixture was then heated at 75° C. for an additional 6 h with stirring to obtain a stock dispersion of $NH_4OH$-neutralized PUM nanoparticles with a pH of 10.0, a solids content of 30.3% and an average particle size of 23.0 nm. A portion of the stock PUM nanoparticle dispersion (9.0 g) was then added to control emulsion 2 (23.04 g). The final pH was measured at 10.0 and the solids content was 44.10%. An MFFT of 0° C., a Koenig hardness of 16.8 s and water whitening value of 3 after 20 minutes of water exposure were obtained on a dried film from the emulsion.

The composition of the present invention provides a way of preparing latexes exhibiting low MFFT and high storage modulus as compared with latexes that do not contain one or more structural units of PUMs. Example 6 and comparative example 1 illustrate this improvement: Whereas the latex containing the PUM exhibited an MFFT of 0° C. and a storage modulus of 100 MPa at 140° C., the latex of comparative example 1, which does not include one or more structural units of the PUM, exhibited an MFFT of 7° C. and a storage modulus of 0.1 MPa at 140° C. The latexes of the present invention have the desired attributes of PUDs and acrylic based latexes in a single formulation.

The invention claimed is:
1. A composition comprising
a) a stable aqueous dispersion of polymer particles having one or more structural units of i) a polyurea macromer; and ii) an acrylate, a methacrylate, a vinyl ester, or a styrene monomer, or a combination thereof; and/or
b) an aqueous mixture of i) polyurea macromer particles and ii) acrylate, methacrylate, vinyl ester, or styrenic polymer particles, or a combination thereof, wherein the polyurea macromer is characterized by the following formula I:

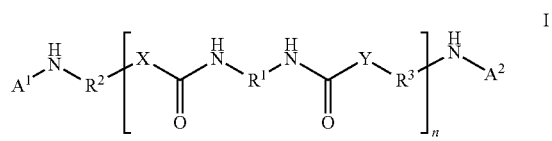

wherein n is 1 to 20;
$R^1$ is 1,6-hexanediyl,

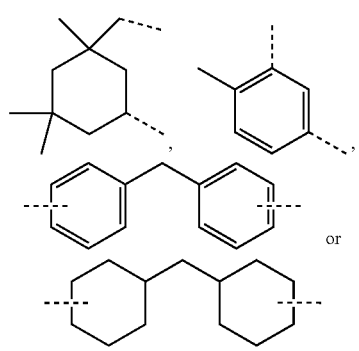

wherein the dotted lines represent the points of attachment;

$R^2$ and $R^3$ are each independently $C_2$-$C_{10}$ linear or branched alkanediyl groups, benzenediyl groups, benzenedimethanediyl groups, or cyclohexanediyl groups;

X and Y are independently O or $NR^4$, wherein $R^4$ is H or $C_1$-$C_6$-alkyl, with the proviso that at least one of X and Y is NH;

at least one of $A^1$ and $A^2$ comprise carboxylic acid functionalized groups selected from the group consisting of:

—C(O)—(Z)$_m$—$R^5$; —CH$_2$CH(OH)(CH$_2$)$_p$COOH; and —CR$^7$=CH—C(O)—O—(CH$_2$)$_p$COOH;

wherein each $R^5$ is independently

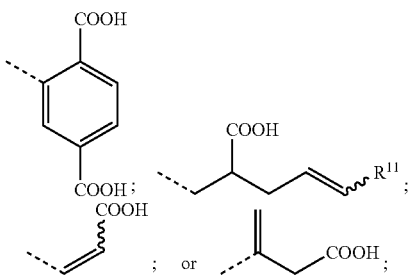

with the proviso that when one of $A^1$ and $A^2$ does not contain carboxylic acid functional groups, the non-carboxylic acid functionalized group is selected from the group consisting of:

—CH$_2$CH(OH)$R^6$; —CR$^7$=CH—C(O)—O—(CH$_2$)$_p$R$^8$; —C(O)—Y'—(CH$_2$)$_p$R$^9$; and —CH$_2$—CH$_2$—C(O)—O—R$^{10}$; wherein each $R^6$ is independently —CH$_2$-acrylate or —CH$_2$-methacrylate;

each $R^7$ is independently H or CH$_3$;

each $R^8$ is independently an acrylate group or a methacrylate group;

each $R^9$ is independently an acrylate group or a methacrylate group;

each $R^{10}$ is independently H or —CH$_2$CH=CH$_2$;

each $R^{11}$ is independently a linear or branched $C_1$-$C_{15}$ alkyl group;

Y' is O or $NR^4$;

m is 0 or 1;

Z is a remnant of a nucleophile; and each p is independently from 2 to 6.

2. The composition of claim 1 wherein X and Y are each NH; n is from 2 to 10; and the polymer particles comprise from 2 to 30 weight percent structural units of the polyurea macromer and from 70 to 98 weight percent of structural units of the acrylate, the methacrylate, or the styrene, or a combination thereof, wherein $A^1$ and $A^2$ are each independently:

—C(O)—(Z)$_m$—$R^5$; —CH$_2$CH(OH)$R^6$; —CR$^7$=CH—C(O)O(CH$_2$)$_p$R$^8$; —C(O)—Y'—(CH$_2$)$_p$R$^9$; or —CH$_2$CH$_2$—C(O)—O—R$^{10}$.

3. The composition of claim 2 wherein $R^1$ is

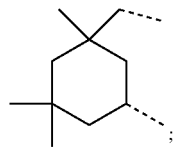

and $R^2$ and $R^3$ are each independently linear or branched $C_3$-$C_{10}$-alkanediyl groups.

4. The composition of claim 2 wherein
m is 0; and
$R^2$ and $R^3$ are each —CH$_2$CH(CH$_3$)— groups; and
$A^1$ and $A^2$ are independently —C(O)—$R^5$.

5. The composition of claim 2 wherein
m is 0; and
at least one of $A^1$ and $A^2$ is —CH$_2$—CH(OH)$R^6$, wherein $R^6$ is —CH$_2$-methacrylate
or —(CH$_2$)$_p$—COOH, wherein p is 2 to 6.

6. The composition of claim 2 wherein at least one of $A^1$ and $A^2$ is
—CR$^7$=CH—C(O)—O—(CH$_2$)$_p$R$^8$; wherein $R^7$ is H, $R^8$ is a methacrylate group or COOH.

7. The composition of claim 2 wherein at least one of $A^1$ and $A^2$ is —C(O)—O—(CH$_2$)$_p$R$^9$ wherein $R^9$ is a methacrylate group; or wherein at least one of $A^1$ and $A^2$ is —CH$_2$—CH$_2$—C(O)O—$R^{10}$.

8. The composition of claim 7 wherein one of $A^1$ and $A^2$ is —C(O)—O—(CH$_2$)$_p$R$^9$ wherein $R^9$ is a methacrylate group; and wherein the other of $A^1$ and $A^2$ is —CH$_2$—CH$_2$—C(O)—O—$R^{10}$.

9. The composition of claim 1 wherein one or both of $A^1$ and $A^2$ comprise carboxylic acid functionalized groups selected from the group consisting of:

—C(O)—(Z)$_m$—$R^5$; —CH$_2$CH(OH)(CH$_2$)$_p$COOH; and —CR$^7$=CHC(O)O(CH$_2$)$_p$COOH;

wherein $R^5$ is

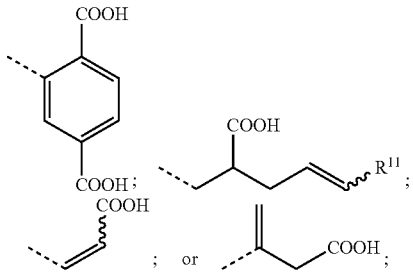

with the proviso that when one of $A^1$ and $A^2$ does not contain carboxylic acid functional groups, the non-carboxylic acid functionalized group is selected from the group consisting of:

—CH$_2$CH(OH)$R^6$; —CR$^7$=CHC(O)O(CH$_2$)$_p$R$^8$; and —C(O)—Y'—(CH$_2$)$_p$R$^9$;

$R^6$ is —CH$_2$-acrylate, or —CH$_2$-methacrylate;

$R^8$ is an acrylate group or a methacrylate group;

$R^9$ is an acrylate group or a methacrylate group; and wherein X and Y are each NH; and the polymer particles comprise from 2 to 30 weight percent structural units of the polyurea macromer and from 70 to 98 weight percent of structural units of the acrylate, the methacrylate, or the styrene, or a combination thereof.

10. The composition of claim 9 wherein $A^1$ and $A^2$ are each
independently —C(O)(O)$_m$—$R^5$; —CH$_2$CH(OH)(CH$_2$)$_p$COOH; or —CR$^7$=CHC(O)O(CH$_2$)$_p$COOH.

11. The composition of claim 10 wherein
m is 0 and n is 2 to 10.

12. The composition of claim 11 wherein
$R^1$ is

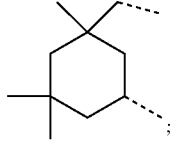

wherein the dotted lines represent the points of attachment; and $R^2$ and $R^3$ are each independently linear or branched $C_3$-$C_{10}$-alkanediyl groups.

13. The composition of claim 12 wherein
$A^1$ and $A^2$ are each —C(O)—$R^5$;
each $R^5$ is independently:

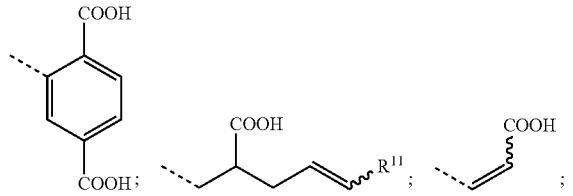

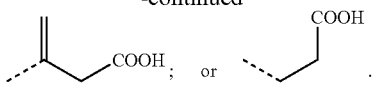

14. The composition of claim 9 wherein
m is 0; and
one of $A^1$ and $A^2$ is —$CH_2$—CH(OH)$R^6$, wherein $R^6$ is —$CH_2$-methacrylate or —$(CH_2)_p$—COOH.

15. The composition of claim 9 wherein
at least one of $A^1$ and $A^2$ is —CH=CHC(O)O$(CH_2)_p$COOH.

16. The composition of claim 9 wherein
one of $A^1$ and $A^2$ is —C(O)O$(CH_2)_p R^9$, wherein $R^9$ is a methacrylate group; and the other
of $A^1$ and $A^2$ is —C(O)$CH_2CH_2$COOH.

* * * * *